United States Patent [19]

Strand

[11] Patent Number: 4,924,436
[45] Date of Patent: * May 8, 1990

[54] DATA STORAGE DEVICE HAVING A PHASE CHANGE MEMORY MEDIUM REVERSIBLE BY DIRECT OVERWRITE AND METHOD OF DIRECT OVERWRITE

[75] Inventor: David Strand, West Bloomfield, Mich.

[73] Assignee: Energy Conversion Devices, Inc., Troy, Mich.

[*] Notice: The portion of the term of this patent subsequent to Oct. 24, 2006 has been disclaimed.

[21] Appl. No.: 75,502

[22] Filed: Jul. 20, 1987

Related U.S. Application Data

[63] Continuation-in-part of Ser. No. 64,645, Jun. 22, 1987.

[51] Int. Cl.$^5$ .................. G11C 13/00; G11B 3/70; G01D 15/10
[52] U.S. Cl. .................. 365/113; 346/76 L; 430/945; 369/286; 365/163; 365/215
[58] Field of Search ............. 365/113, 120, 127, 163, 365/106, 215, 112, 114; 357/2; 369/277, 283, 286; 346/76 L, 135.1, 137; 430/945, 19

[56] References Cited

U.S. PATENT DOCUMENTS

| | | | |
|---|---|---|---|
| 4,633,273 | 12/1986 | Watanabe et al. | 346/135.1 |
| 4,660,175 | 4/1987 | Strand | 365/113 |
| 4,667,309 | 5/1987 | Hennessey | 365/113 |
| 4,710,911 | 12/1987 | Yamada et al. | 346/76 L |
| 4,719,594 | 1/1988 | Young et al. | 365/113 |

OTHER PUBLICATIONS

Watanabe et al., "New Optical Recording Material for Video Disc System", Jour. of App. Physics, vol. 54, #3, Mar. 1983, pp. 1256-1260.

Primary Examiner—Stuart N. Hecker
Assistant Examiner—Glenn A. Gossage
Attorney, Agent, or Firm—Richard M. Goldman; Marvin S. Siskind; Kenneth M. Massaroni

[57] ABSTRACT

A method and apparatus for direct, single beam, overwrite of new data over existing data in a phase change optical data storage device are disclosed. This eliminates the need for an intermediate erase step.

2 Claims, 1 Drawing Sheet

U.S. Patent
May 8, 1990
4,924,436
FIG. 1
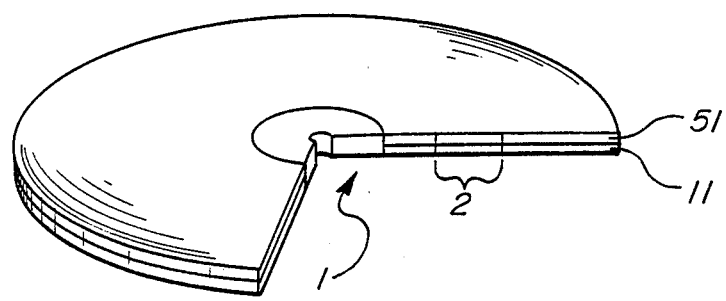
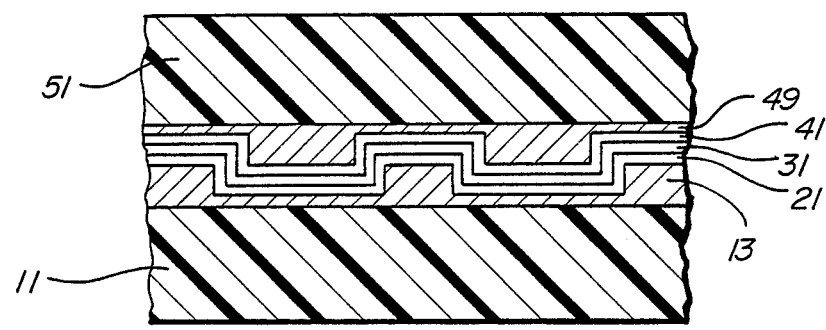
FIG. 2

DATA STORAGE DEVICE HAVING A PHASE CHANGE MEMORY MEDIUM REVERSIBLE BY DIRECT OVERWRITE AND METHOD OF DIRECT OVERWRITE

CROSS REFERENCE TO RELATED APPLICATION

This is a continuation-in-part of commonly assigned, copending U.S. application Ser. No. 07/064,645, filed June 22, 1987, of Randall R. Ross, Eric Bjornard, and David Strand for DATA STORAGE DEVICE HAVING A PHASE CHANGE MEMORY MEDIUM REVERSIBLE BY DIRECT OVERWRITE.

FIELD OF THE INVENTION

The invention disclosed herein relates to data storage devices, where data is stored in a material that is reversibly switchable between detectable states by the application of projected beam energy thereto.

BACKGROUND OF THE INVENTION

Nonablative state changeable data storage systems, for example, optical data storage systems, record information in a state changeable material that is switchable between at least two detectable states by the application of projected beam energy thereto, for example, optical energy.

State changeable data storage material is incorporated in a data storage device having a structure such that the data storage material is supported by a substrate and encapsulated in encapsulants. In the case of optical data storage devices, the encapsulants include, for example, anti-ablation materials and layers, thermal insulation materials and layers, anti-reflection materials and layers, reflective layers, and chemical isolation layers. Moreover, various layers may perform more than one of these functions. For example, anti-reflection layers may also be anti-ablation layers and thermal insulating layers. The thicknesses of the layers, including the layer of state changeable data storage material, are optimized to minimize the energy necessary for state change and optimize the high contrast ratio, high carrier to noise ratio, and high stability of state changeable data storage materials.

The state changeable material is a material capable of being switched from one detectable state to another detectable state or states by the application of projected beam energy thereto. State changeable materials are such that the detectable states may differ in their morphology, surface topography, relative degree of order, relative degree of disorder, electrical properties, optical properties including the absorption coefficient, the indices of refraction and reflectivity, or combinations of one or more of these properties. The state of state changeable material is detectable by the electrical conductivity, electrical resistivity, optical transmissivity, optical absorption, optical refraction, optical reflectivity, or combinations thereof.

Formation of the data storage device includes deposition of the individual layers, for example by evaporative deposition, chemical vapor deposition, and/or plasma deposition. As used herein plasma deposition includes sputtering, glow discharge, and plasma assisted chemical vapor deposition.

Tellurium based materials have been utilized as state changeable materials for data storage where the state change is a structural change evidenced by a change in reflectivity. This effect is described, for example, in J. Feinleib, J. deNeufville, S. C. Moss, and S. R. Ovshinsky, "Rapid Reversible Light-Induced Crystallization of Amorphous Semiconductors," *Appl. Phys. Lett.*, Vol. 18 (6), pages 254–257 (Mar.15, 1971), and in U.S. Pat. No. 3,530,441 to S.R. Ovshinsky for *Method and Apparatus For Storing And Retrieving Of Information*. A recent description of tellurium-germanium-tin systems, without oxygen, is in M. Chen, K. A. Rubin, V. Marrello, U. G. Gerber, and V. B. Jipson, "Reversibility And Stability of Tellurium Alloys for Optical Data Storage," *Appl. Phys. Lett.*, Vol. 46(8), pages 734–736 (Apr. 15, 1985). A recent description of tellurium-germanium-tin systems with oxygen is in M. Takenaga, N. Yamada, S. Ohara, K. Nishiciuchi, M. Nagashima, T. Kashibara, S. Nakamura, and T. Yamashita, "New Optical Erasable Medium Using Tellurium Suboxide Thin Film,"*Proceedings, SPIE Conference on Optical Data Storage*, Arlington, Va., 1983, pages 173–177.

Tellurium based state changeable materials, in general, are single or multi-phased systems (1) where the ordering phenomena include a nucleation and growth process (including both or either homogeneous and heterogeneous nucleations) to convert a system of disordered materials to a system of ordered and disordered materials, and (2) where the vitrification phenomenon includes melting and rapid quenching of the phase changeable material to transform a system of disordered and ordered materials to a system of largely disordered materials. The above phase changes and separations occur over relatively small distances, with intimate interlocking of the phases and gross structural discrimination, and can be highly sensitive to local variations in stoichiometry.

A serious limitation to the rate of data transfer is the slow cycle time, which is, in turn, limited by the crystallizing or erasing time. Phase change data storage systems suffer from a deficiency not encountered in magnetic data storage systems. In magnetic data storage systems, a new recording is made over an existing recording, simultaneously erasing the existing recording. This is not possible with phase change media optical data storage systems. To the contrary, phase change optical data storage systems require separate erase (crystallize) and write (vitrify) steps in the "write" cycle in order to enter data where data already exists.

An important operational aspect of this problem is that the long duration of the erasing or crystallization process unduly lengthens the time required for the erase-rewrite cycle. In prior art systems, the phase change materials have an erase (crystallization) time of 0.5 micro seconds or larger. This has necessitated such expedients as an elliptic laser beam spot to lengthen the irradiation time. However, for reading and for writing (vitrifying) another spot, e.g., a round spot, is necessary. This required two optical systems. Thus, in prior art phase change systems a two laser erase-write cycle is utilized. This requires a two laser head. This is a complex system, and difficult to keep aligned. The first laser erases (crystallized) a data segment or sector. Thereafter, the data segment or sector is written by the second laser, e.g., by programmed vitrification.

In the case of magneto-optic systems, two complete disc revolutions are required per cycle, one for erasing and one for writing. This particularly limits the ability to use these prior art erasable discs in real time recording of long data streams.

SUMMARY OF THE INVENTION

According to the invention herein contemplated there is provided a method and apparatus for direct single beam overwrite. By direct overwrite is meant rewriting, i.e., vitrifying, without first erasing (crystallizing in phase change systems) any pre-existing data. The invention described herein provides optical data entry in a manner analogous to that of magnetic discs, i.e., direct overwrite without a first, separate, discrete, erasure (crystallization) step.

According to the invention there is provided a local thermal environment that allows the laser pulse, that is the intensity, the duration, or the integral of the intensity with respect to time, to be the determinant of the state of the phase change data storage material. This may be accomplished by melting the phase change material, with superheating of the molten phase change material, with the superheat heating adjacent material, and allowing the phase change material, and the layers in contact therewith, to act as a thermal capacitance to reduce the the cooling rate, dTemperature/dTime, of the solidifying phase change material in crystallization, while permitting a higher cooling rate, dTemperature/dTime, of the solidifying phase change material to obtain an amorphous material.

According to a preferred exemplification of the invention, erasure (crystallization in the case of phase change systems) is affected by heating both a memory cell of phase change material and the surrounding thermal environment to a high enough temperature to slowly cool the molten phase change material and form a crystalline solid thereof, and writing (vitrification in the case of phase change systems) is affected by heating a memory cell of phase change material high enough to melt the material while avoiding significant heating of the surrounding thermal environment so that the aforementioned surrounding thermal environment acts as a heat sink for the molten phase change material to rapidly cool the molten phase change material and form an amorphous solid thereof. As used herein, the "thermal environment" refers primarily to adjacent layers.

For example, during the record or vitrification step, at a first, relatively low power level, $P_1$, the energy incident upon a memory cell and absorbed by the phase change material is enough to melt a memory cell of the phase change material, but insufficient to significantly heat surrounding and adjacent layers and memory cells. Thus, the cooling rate, dTemperature/dTime, of the solidifying phase change material is relatively high, and the phase change material cools and solidifies into the amorphous state.

By way of contrast, during the erase or crystallization step, at a second, relatively high power level, $P_2$, the energy incident upon a memory cell and absorbed by the phase change material is enough to both melt the phase change material and heat the surrounding thermal environment high enough to slow or retard the cooling rate, dTemperature/dTime, of the solidifying phase change material to an extent that permits the phase change material to solidify into a crystalline state.

According to the invention, the optical reflectivities and optical absorptions of each state of the phase change recording medium are tailored such that the amount of the energy absorbed per unit volume of the phase change material is independent of the state of the phase change material. This results in the same temperature-time profile for both states for any given incident power level.

In the practice of the invention a data storage device is utilized, for example, having a chalcogenide compound or mixture of chalcogenide compounds as the data storage medium. The material exhibits crystallization times of under 1 microsecond (1000 nanoseconds), direct overwrite capability, and preferably a long cycle life. A substrate supports the medium, and dielectric films encapsulate the phase change material data storage medium.

In order to take greatest advantage of direct, single beam, overwrite, the data storage medium should be one that can undergo structural transformation with minimal compositional change so as to exhibit rapid ordering phenomenon, e.g., crystallization. Thus, the data storage material itself should be one that chemically and morphologically provides reduced time for switching from the less ordered detectable state to the more ordered detectable state.

The preferred data storage media are those that have a fast enough crystallization time to avoid damage or degradation of the substrate, and to allow the use of relatively inexpensive solid state lasers for writing and erasing, but high enough to provide a measure of archival thermal stability. Preferably the crystallization temperature is from above about 120 degrees Centigrade and even above e.g. to about 200 degrees Centigrade or even higher. Preferably, in order to take advantage of direct, single beam, overwrite, e.g., for real time data entry the data storage medium composition has a switching time, i.e., an "erase" time or "crystallization" time of less than 1 microsecond, and preferably less then 500 nanoseconds.

In a further exemplification, one or more of writing data into a data storage device, reading data out of the data storage device, or erasing data from the data storage device is performed. The method comprises writing data into the data storage medium with electromagnetic energy of a first energy density and duration, reading the state of the data storage medium with electromagnetic energy of a second energy density and duration, and direct overwriting of new data into the data storage medium atop the unerased data already present with electromagnetic energy of a proper energy density and duration, for example of the same energy density and duration as the first write, or at a different energy density and duration.

The data storage medium may be formed by depositing the materials to form a substantially uniform deposit thereof. Generally, the deposit has a thickness of an even multiple of one quarter of the product of the optical index of refraction of the material and the laser wavelength.

THE DRAWINGS

The invention may be particularly understood by reference to the drawings appended hereto.

FIG. 1 is a partial cut away isometric view, not to scale, with exaggerated latitudinal dimensions and vertical scale, of an optical data storage device.

FIG. 2 is a detailed section of the part of the optical data storage device of FIG. 1 showing the relationship of the various layers thereof.

DETAILED DESCRIPTION OF THE INVENTION

According to the invention described herein, there is provided a method and apparatus for direct, single beam, overwrite of data into a projected beam storage device having a phase change data storage medium switchable between detectable states by the application of projected beam energy thereto.

FIGS. 1 and 2 show a projected beam data storage device 1 having a substrate, for example, a plastic substrate 11, a first encapsulating dielectric layer 21, for example a first germanium oxide encapsulating layer, a chalcogenide phase change compound data storage medium layer 31, a second dielectric layer 41, e.g., a second germanium oxide layer 41, and a second substrate, e.g. plastic substrate 51.

FIG. 2 shows a section of the data storage device 1 of FIG. 1 in greater detail. As there shown, the substrate 11 is a polymeric sheet, for example a polymethyl methacrylate sheet. The substrate 11 is an optically invariant, optically isotropic, transparent sheet. The preferred thickness is of from about 1 mm to about 1.5 mm.

Atop the substrate 11 may be a film, sheet, or layer 13, e.g., a polymerized acrylic sheet. Polymerized, molded, injection molded, or cast into the polymeric sheet 13 may be grooves. Alternatively, the grooves may be in the substitute 11, in which case the film, sheet, or layer 13 may be omitted. When grooves are present they may have thickness from about 500 to about 1000 Angstroms. The film, sheet, or layer 13 may act as an adhesive, holding the substrate 11 to the encapsulants. It has a thickness of from about 30 to about 200 microns and preferably from about 50 to about 100 microns.

Deposited atop the polymerized sheet 13 is a dielectric barrier layer 21. The dielectric barrier layer 21, for example, of germanium oxide, is from about 500 to about 2000 angstroms thick. Preferably it has a thickness of 1030 Angstroms and an optical thickness of one-quarter times the laser wavelength times the index of refraction of the material forming the dielectric layer 21. The dielectric barrier layer 21 has one or more functions. It serves to prevent oxidizing agents from getting to the chalcogen active layer 31 and prevents the plastic substrate from deforming due to local heating of the chalcogenide layer 31, e.g., during recording or erasing. The barrier layer 21 also serves as an anti-reflective coating, increasing the optical sensitivity of the chalcogenide active layer 31.

Other dielectrics may provide the encapsulating layers 21, 41. For example, the encapsulating layers may be silicon nitride, layered or graded to avoid diffusion of silicon into the chalcogenide layer 31. Alternatively, the encapsulating dielectric layers 21, 41 may be silica, alumina, silicon nitride, or other dielectric.

The compound data storage medium 31 has an optical thickness of one half of the laser wavelength times the index of refraction of the data storage material, i.e., about 800 Angstroms. Atop the 31 and in contact with the opposite surface thereof is a second dielectric layer 41, e.g., a germanium oxide layer. The second dielectric layer 41 may, but need not be of equal thickness as the first layer 21. Preferably it has a thickness of one half times the laser wavelength times the index of refraction.

A second polymer layer 49 and a second substrate layer 51 may be in contact with the opposite surface of the encapsulating layer 41, alternatively an air sandwich structure may be utilized.

The polyacrylate layers 13, 49, when present, are cast or molded in place. These layers 13, 49 can be photopolymerized in place, e.g., by the application of ultraviolet light. The barrier layers 21, 41, are deposited, by evaporation, for example, of germanium and germanium oxide materials, or by sputtering, including reactive sputtering where the content of the reactive gas used in reactive sputtering is controlled. The chalcogenide film 31 may be prepared by evaporation, or by sputtering, o by chemical vapor deposition.

According to the invention there is provided a local thermal environment that allows the laser pulse, that is the intensity, the duration, or the integral of the intensity with respect to time, to be the determinant of the state of the phase change data storage material 31. This may be accomplished by melting the phase change material 31, with superheating of the molten phase change material 31, with the superheat heating adjacent material, as the encapsulating dielectrics 21 and 41, and allowing the phase change material 31, and the layers, 21 and 41, in contact therewith, to act as a thermal capacitance to reduce the the cooling rate, dTemperature/dTime, of the solidifying phase change material 31 in crystallization, while permitting a higher cooling rate, dTemperature/dTime, of the solidifying phase change material 31 to obtain an amorphous material.

According to a preferred exemplification of the invention, erasure (crystallization) is affected by heating both a memory cell of phase change material 31 and the surrounding thermal environment, as the dielectric layers 21 and 41, as well as other layers, for example thermal insulation layers, heat sink layers, reflector layers, hermetic seal layers, and the like, to a high enough temperature to allow slow cooling of the molten phase change material 31 and form a crystalline solid thereof, and writing (vitrification) is affected by heating a memory cell of phase change material 31 high enough to melt the material while avoiding significant heating of the surrounding thermal environment so that the aforementioned surrounding thermal environment acts as a heat sink for the molten phase change material 31 to force rapid cooling of the molten phase change material 31 and form an amorphous solid thereof.

For example, during the record or vitrification step, at a first, relatively low power level, $P_1$, the energy incident upon a memory cell and absorbed by the phase change material 31 is enough to melt a memory cell of the phase change material 31, but insufficient to to significantly heat surrounding and adjacent layers e.g., layers 21 and 41, and memory cells. Thus, the cooling rate, dTemperature/dTime, of the solidifying phase change material 31 is relatively high, and the phase change material 31 cools and solidifies into the amorphous state.

By way of contrast, during the erase or crystallization step, at a second, relatively high power level, $P_2$, the energy incident upon a memory cell and absorbed by the phase change material 31 is enough to both melt the phase change material 31 and heat the surrounding thermal environment, e.g., layers 21 and 41, as well as other layers, not shown, high enough to retard the cooling rate, dTemperature/dTime, of the solidifying phase change material to an extent that permits the phase change material to solidify into a crystalline state.

A cooling rate, dTemperature/dTime, low enough to obtain a crystallized phase change material 31 may be obtained by heating the thermal environment surrounding the memory cell hot enough to retard the cooling rate thereof, so that phase change continues long after the laser has gone on to subsequent memory cells. This effectively increases the crystallization time in terms of structural phenomena within the device, i.e, the phase change material layer 31, and surrounding layers, 21 and 41, while accelerating the erase speed in terms of the laser pulse, the disc rotation, and the rate of data entry. In this way crystallization time is effectively decoupled from data entry rate.

The optical reflectivities and optical absorptions of the states of the phase change recording medium are tailored such that the amount of the energy absorbed per unit volume of the phase change material is independent of the state of the phase change material. This results in the same temperature-time profile for both states for any given incident power level. Generally, this means that the state having the higher reflectivity also has a higher absorption coefficient, such that higher energy losses caused by higher reflectivity in one state are balanced by higher losses in the other state caused by lower absorption. This provides for the same portion of the incident beam energy to be absorbed by the memory material in each state.

In one alternative exemplification the non-ablative, phase change memory material 31 is a miscible telluride-selenide solid solution, for example a telluride-selenide solid solution of arsenic, antimony, or bismuth. Preferred is antimony (telluride-selenide), which is single phase in both the amorphous (written) and crystalline (erased) states, and has a crystallization temperature above about 120 degrees Centigrade. One particularly preferred composition for the phase change material is $(Sb_2Se_3)_{1-x}(Sb_2Te_3)_x$ where x is from 0.18 to 0.43.

In a further exemplification, one or more of writing data into a data storage device, reading data out of the data storage device, or erasing data from the data storage device is performed. The method comprises writing data into the data storage medium with electromagnetic energy of a first energy density and duration, reading the state of the data storage medium with electromagnetic energy of a second energy density and duration, and direct overwriting of new data into the data storage medium atop the unerased data already present with electromagnetic energy of a proper energy density and duration, for example of the same energy density and duration as the first write, or at a different energy density and duration.

In order to take greatest advantage of direct, single beam, overwrite, the data storage medium should be one that can undergo structural transformation with minimal compositional change so as to exhibit rapid ordering phenomenon, e.g., crystallization. Thus, the data storage material itself should be one that chemically and morphologically provides reduced time for switching from the less ordered detectable state to the more ordered detectable state.

While the invention has been described with respect to certain preferred exemplifications and embodiments thereof it is not intended to be bound thereby but solely by the claims appended hereto.

We claim:

1. A method of storing data in individual memory cells of a data storage disc having a layer of non-ablative, reversible, phase change data storage medium between adjacent heat sink layers, said data storage medium comprising a miscible telluride-selenide solid solution having a crystallization time of less then 1 microsecond and chosen from the group consisting of:
    (a) arsenic telluride-arsenic selenide;
    (b). antimony telluride-antimony selenide;
    (c). bismuth telluride-bismuth selenide; and
    (d). mixtures thereof; which method comprises:
    (1). single laser beam direct overwrite storing data of one sense by heating within a track an individual memory cell comprised of phase change material and adjacent heat sink layers with a first, high energy pulse to melt and superheat the phase change material and adjacent heat sink layers, and thereafter allowing the phase change material of the individual memory cell to slowly cool and crystallize; and
    (2). single laser beam direct overwrite storing data of another sense by heating within the same track another individual memory cell comprised of phase change material and adjacent heat sink layers with a second, low energy pulse to melt and heat the phase change material and adjacent heat sin layers, and thereafter allowing the phase change material of the individual memory cell to rapidly cool and vitrify.

2. The method of claim 1 wherein the superheated phase change material, melted and superheated by the first high energy pulse, cools at a first cooling rate, $dTemperature/dTime_1$, and said phase change material, melted by the second low energy pulse cools at a second cooling rate, $dTemperature/dTime_2$, wherein said second cooling rate, $dTemperature/dTime_2$, is higher than said first cooling rate, $dTemperature/dTime_1$.

* * * * *